(12) United States Patent
Zhu et al.

(10) Patent No.: US 10,592,785 B2
(45) Date of Patent: Mar. 17, 2020

(54) INTEGRATED SYSTEM FOR DETECTION OF DRIVER CONDITION

(71) Applicant: Futurewei Technologies, Inc., Plano, TX (US)

(72) Inventors: Yingxuan Zhu, Cambridge, MA (US); Lifeng Liu, Sudbury, MA (US); Xiaotian Yin, Belmont, MA (US); Jun Zhang, Cambridge, MA (US); Jian Li, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 15/647,748

(22) Filed: Jul. 12, 2017

(65) Prior Publication Data

US 2019/0019068 A1    Jan. 17, 2019

(51) Int. Cl.
*G06K 9/00*       (2006.01)
*G06K 9/62*       (2006.01)
(Continued)

(52) U.S. Cl.
CPC ............ *G06K 9/6293* (2013.01); *B60K 28/02* (2013.01); *B60W 40/08* (2013.01); *B60W 50/14* (2013.01);
(Continued)

(58) Field of Classification Search
CPC ........... G06K 9/00221; G06K 9/00302; G06K 9/00308; G06K 9/00315; G06K 9/00335;
(Continued)

(56) References Cited

U.S. PATENT DOCUMENTS

| 7,091,867 B2 | 8/2006 | Wenstrand |
| 8,209,182 B2 | 6/2012 | Narayanan |

(Continued)

FOREIGN PATENT DOCUMENTS

| CN | 101593352 A | 12/2009 |
| CN | 102073857 A | 5/2011 |

(Continued)

OTHER PUBLICATIONS

"International Application No. PCT/CN2018/092897, International Search Report dated Sep. 25, 2018", (Sep. 25, 2018), 10 pgs.

(Continued)

*Primary Examiner* — Eric Rush
(74) *Attorney, Agent, or Firm* — Schwegman Lundberg & Woessner, P.A.

(57) ABSTRACT

Methods, apparatus, and systems are provided for integrated driver expression recognition and vehicle interior environment classification to detect driver condition for safety. A method includes obtaining an image of a driver of a vehicle and an image of an interior environment of the vehicle. Using a machine learning method, the images are processed to classify a condition of the driver and of the interior environment of the vehicle. The machine learning method includes general convolutional neural network (CNN) and CNN with adaptive filters. The adaptive filters are determined based on influence of filters. The classification results are combined and compared with predetermined thresholds to determine if a decision can be made based on existing information. Additional information is requested by self-motivated learning if a decision cannot be made, and safety is determined based on the combined classification results. A warning is provided to the driver based on the safety determination.

16 Claims, 14 Drawing Sheets

(51) Int. Cl.
*G06K 9/46* (2006.01)
*B60K 28/02* (2006.01)
*B60W 40/08* (2012.01)
*B60W 50/14* (2020.01)
*G05D 1/00* (2006.01)

(52) U.S. Cl.
CPC ....... *G05D 1/0061* (2013.01); *G06K 9/00302* (2013.01); *G06K 9/00832* (2013.01); *G06K 9/00845* (2013.01); *G06K 9/4628* (2013.01); *G06K 9/6274* (2013.01); *G06K 9/6288* (2013.01); *G06K 9/6289* (2013.01); *B60W 2040/0827* (2013.01); *B60W 2040/0836* (2013.01); *B60W 2420/42* (2013.01); *B60Y 2302/03* (2013.01); *B60Y 2400/90* (2013.01); *G05D 1/0088* (2013.01); *G05D 2201/02* (2013.01); *G06K 9/6277* (2013.01); *G06K 2009/00328* (2013.01); *G06K 2209/03* (2013.01); *G06T 2207/30268* (2013.01)

(58) Field of Classification Search
CPC ........... G06K 9/00362; G06K 9/00624; G06K 9/00785; G06K 9/00791; G06K 9/00798; G06K 9/00805; G06K 9/00832; G06K 9/00845; G06K 9/4628; G06K 9/62; G06K 9/6267; G06K 9/627; G06K 9/6274; G06K 9/6277; G06K 9/6278; G06K 9/6288; G06K 9/6289; G06K 9/6292; G06K 9/6293; G06K 2009/00328; G06K 2209/03; G06T 2207/30248; G06T 2207/30252; G06T 2207/30268; G05D 1/0055; G05D 1/0061; G05D 1/0088; G05D 2201/02; B60K 28/02; B60K 28/06; B60W 40/02; B60W 40/04; B60W 40/06; B60W 40/08; B60W 40/09; B60W 2040/0818; B60W 2040/0827; B60W 2040/0836; B60W 2040/0845; B60W 2040/0872; B60W 2040/089; B60W 50/08; B60W 50/14; B60Y 2302/00; B60Y 2302/03; B60Y 2400/90
USPC ....... 382/100, 104, 118, 155–159, 181, 224; 340/438, 540, 573.1, 574–576; 348/148; 701/1, 36, 40, 44, 57–60, 98; 706/12, 15, 706/20, 21, 26, 27, 45, 902, 903, 905; 180/271, 272
See application file for complete search history.

(56) References Cited

U.S. PATENT DOCUMENTS

| | | | | |
|---|---|---|---|---|
| 9,135,803 | B1* | 9/2015 | Fields | G06K 9/00845 |
| 9,955,326 | B2* | 4/2018 | Avrahami | H04L 67/12 |
| 10,163,018 | B1* | 12/2018 | Chan | G06K 9/00845 |
| 10,262,226 | B1* | 4/2019 | Flowers | G06K 9/00201 |
| 2010/0134302 | A1* | 6/2010 | Ahn | A61B 5/165 340/576 |
| 2016/0046298 | A1* | 2/2016 | DeRuyck | G06K 9/00845 340/576 |
| 2016/0267335 | A1* | 9/2016 | Hampiholi | G06K 9/00597 |
| 2017/0076195 | A1* | 3/2017 | Yang | G06N 3/063 |
| 2018/0001899 | A1* | 1/2018 | Shenoy | B60W 40/09 |
| 2018/0053093 | A1* | 2/2018 | Olabiyi | G06N 3/0454 |
| 2018/0053102 | A1* | 2/2018 | Martinson | B60R 16/0232 |
| 2018/0126901 | A1* | 5/2018 | Levkova | G06K 9/00845 |
| 2018/0251122 | A1* | 9/2018 | Golston | B60W 40/02 |
| 2018/0330178 | A1* | 11/2018 | el Kaliouby | G06K 9/00845 |
| 2018/0365533 | A1* | 12/2018 | Sathyanarayana | G06K 9/00845 |

FOREIGN PATENT DOCUMENTS

| | | |
|---|---|---|
| CN | 106530829 A | 3/2017 |
| JP | 2010029537 A | 2/2010 |
| WO | WO-2014010214 A1 | 1/2014 |

OTHER PUBLICATIONS

"10 million self-driving cars will be on the road by 2020", *Business Insider*. [online]. Retrieved from the Internet: <URL: http://www.businessinsider.com/report-10-million-self-driving-cars-will-be-on-the-road-by-2020-2015-5-6>, (Jun. 15, 2016), 2 pgs.

"An Examination of Driver Distraction as Recorded in NHTSA Databases", Traffic Safety Facts, Research Note, (Sep. 2009), 12 pgs.

"Teen Driver Car Accident Statistics", © 2002-2018 EdgarSnyder.com, [online]. Retrieved from the Internet: <URL: https://www.edgarsnyder.com/car-accident/who-was-injured/teen/teen-driving-statistics.html>, (2012), 8 pgs.

"Want to guess what happens when you get into a gunfight in the front seat of your car while driving down the road?", *Times-Picayune*. [online]. Retrieved from the Internet: <https://laststandonzombieisland.com/2014/12/11/want-to-guess-what-happens-when-you-get-into-a-gunfight-in-the-front-seat-of-your-car-while-driving-down-the-road/>, (Dec. 11, 2014), 1 pg.

Corneanu, Ciprian A., et al., "Survey on RGB, 3D, Thermal, and Multimodal Approaches for Facial Expression Recognition: History, Trends, and Affect-related Applications", IEEE Trans Pattern Anal Mach Intell.,38(8), (Aug. 2016), 1548-1568.

Garcia, Stacy G., et al., "Stay Alive, Don't Text and Drive", [online]. Retrieved from the Internet: <URL: https://www.theodysseyonline.com/stay-alive-dont-text-and-drive>, (2015), 2 pgs.

Knapton, Sarah, "Which emotion raises the risk of a car crash by nearly 10 times?", © 2018 Telegraph Media Group Limited. [online]. Retrieved From the Internet: <URL: https://www.telegraph.co.uk/news/science/science-news/12168472/Which-emotion-raises-the-risk-of-a-car-crash-by-nearly-10-times.html>, (Feb. 22, 2016), 4 pgs.

Smith, Bryant W., "Hiuman Error as a Cause of Vehicle Crashes", The Center for Internet and Society. [online], Retrieved from the Internet: <URL: http://cyberlaw.stanford.edu/blog/2013/12/human-error-cause-vehicle-crashes>, (Dec. 18, 2013), 3 pgs.

* cited by examiner

INTEGRATED SYSTEM FOR DETECTION OF DRIVER CONDITION

TECHNICAL FIELD

The present disclosure relates to vehicle safety systems, and in particular to systems and methods for detection of driver condition based on integrated information from driver expression and interior environment in vehicles that each have an autonomous system.

BACKGROUND

As vehicles that each have an autonomous system are being developed for operation on public roads, the vehicles need to have layers of safety features to prevent collisions with other vehicles or fixed objects. A driver of a vehicle with an autonomous system may retain the ability to control the vehicle, and thus safety features should contemplate how driver input can impact overall vehicle safety.

SUMMARY

Methods, apparatus, and systems are provided for an integrated detection system of driver condition for safety. Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer-implemented warning method includes obtaining, by one or more processors, at least one image of a driver of a vehicle, and obtaining, by the one or more processors, at least one image of an interior environment of the vehicle. A condition of the driver is classified by a machine learning method, based on information from the at least one image of the driver, and a condition of the interior environment of the vehicle is classified using the machine learning method, based on information from the at least one image of the interior environment of the vehicle. Classification results from the at least one image of the driver and classification results from the at least one image of the interior environment of the vehicle are combined, and the combined classification results are compared with predefined thresholds to determine if a decision can be made based on existing information. Additional information regarding driver expression is requested when a decision cannot be made based on existing information. Safety of the vehicle is determined based on the combined classification results and a warning is provided by the one or more processors to the driver based on the safety determination, in various embodiments.

Optionally, in any of the preceding aspects, the machine learning method includes a general convolutional neural network (CNN) and a CNN using adaptive filters, the use of the adaptive filters is based on trained results of parameters, and the adaptive filters are applied to the at least one image of the interior environment of the vehicle and are also applied to activation maps from upper level layers in the CNN.

Optionally, in any of the preceding aspects, the method includes calculating a conditional probability of the interior environment condition given driver condition, determining filters of CNN that have less than a prescribed influence in the output, reducing and adapting the use of filters in the CNN based on the determination, and determining if CNN with adaptive filters should be used in processing live data.

The method further includes using backpropagation and chain rule to determine filters that have less than the prescribed influence in the outputs for a given driver condition, in any of the preceding aspects.

The method further includes comparing the outputs of each layer to a threshold value, and setting parameters to zero if the outputs of these parameters are less than the threshold value, in any of the preceding aspects.

Optionally, in any of the preceding aspects, the method includes using a lookup table including driver conditions and corresponding interior environment conditions, when conditional probabilities of interior environment conditions given driver conditions are higher than the threshold value.

Optionally, in any of the preceding aspects, the method includes using the CNN with adaptive filters to process live data of interior environment conditions. In various aspects, the live data include at least one image of driver condition and at least one image of interior environment condition, the at least one image of the driver is part of a video and the processing of the at least one image is part of processing the video, and/or the at least one image of the interior environment of the vehicle is part of a video and the processing of the at least one image is part of processing the video.

Optionally, in any of the preceding aspects, the method includes obtaining a probability of dangerousness using data of interior environment of a vehicle and data of driver facial expression, comparing the probability with thresholds, determining actions, if the probability is not within the thresholds, determining whether a maximum number of trials is reached, requesting additional data of driver expressions if the maximum number of trials is not reached, and setting the probability to an upper threshold if the maximum number of trials is reached.

Optionally, in any of the preceding aspects, the method includes combining the probability with a probability obtained from additional data of driver expressions, and providing a warning if the probability is equal to or larger than the upper threshold, and not providing the warning if the probability is equal to or less than a lower threshold.

According to another aspect of the present disclosure, a warning device includes a non-transitory memory storage comprising instructions and one or more processors in communication with the memory storage. The one or more processors execute the instructions to obtain at least one image of a driver of a vehicle, obtain at least one image of an interior environment of the vehicle, classify a condition of the driver by machine learning method, based on information from the at least one image of the driver, classify a condition of the interior environment of the vehicle using the machine learning method, based on information from the at least one image of the interior environment of the vehicle, combine classification results from the at least one image of the driver and classification results from the at least one image of the interior environment of the vehicle, compare the combined classification results with predefined thresholds to determine if a decision can be made based on existing information, and request additional information regarding driver expression when a decision cannot be made based on existing information. A determination of safety of the vehicle is based on the combined classification results, and a warning is provided to the driver based on the safety determination.

Optionally, in any of the preceding aspects, the machine learning method includes a general CNN and a CNN using adaptive filters, wherein the use of the adaptive filters is adjusted based on trained results of parameters, and wherein the adaptive filters are applied to the at least one image of the interior environment of the vehicle and are also applied to activation maps from upper level layers in the CNN.

Optionally, in any of the preceding aspects, the machine learning method is configured to process the interior environment image or images to classify the interior environment including identifying a phone with text on a display, alcohol, drugs, and/or a weapon.

According to another aspect of the present disclosure, a vehicle includes a plurality of sensors configured to obtain images, a non-transitory memory storage comprising instructions, and one or more processors in communication with the memory storage and the plurality of sensors. According to various embodiments, the one or more processors execute the instructions to obtain at least one image of a driver of the vehicle from at least one of the plurality of sensors, obtain at least one image of an interior environment of the vehicle from at least one of the plurality of sensors, classify a condition of the driver by machine learning method, based on information from the at least one image of the driver, classify a condition of the interior environment of the vehicle using the machine learning method, based on information from the at least one image of the interior environment of the vehicle, combine classification results from the at least one image of the driver and classification results from the at least one image of the interior environment of the vehicle, compare the combined classification results with predefined thresholds to determine if a decision can be made based on existing information, request additional information regarding driver expression when a decision cannot be made based on existing information, determine safety of the vehicle based on the combined classification results, and provide a warning to the driver based on the safety determination.

Optionally, in any of the preceding aspects, the method includes using a first machine learning method to process the at least one image of the driver and using a second machine learning method to process the image of the interior environment of the vehicle.

Optionally, in any of the preceding aspects, the vehicle is a vehicle with an autonomous system.

Optionally, in any of the preceding aspects, using the machine learning method to process the image of the driver includes using speech of the driver, facial expressions of the driver, gestures of the driver, and/or physiological information of the driver.

Optionally, in any of the preceding aspects, the machine learning method includes a general CNN and a CNN using adaptive filters, wherein the use of the adaptive filters is adjusted based on trained results of parameters, and wherein the adaptive filters are applied to the at least one image of the interior environment of the vehicle and are also applied to activation maps from upper level layers in the CNN.

Optionally, in any of the preceding aspects, a self-motivated algorithm is used to obtain additional data for the machine learning method.

Optionally, in any of the preceding aspects, classifying a condition of the driver of the vehicle includes recognizing at least one of a distracted driver, a drunk driver, a drowsy driver, and/or a frustrated driver.

Any one of the foregoing examples may be combined with any one or more of the other foregoing examples to create a new embodiment within the scope of the present disclosure.

This Summary is an overview of some of the teachings of the present application and not intended to be an exclusive or exhaustive treatment of the present subject matter. Further details about the present subject matter are found in the detailed description and appended claims. The scope of the present inventive subject matter is defined by the appended claims and their legal equivalents.

DETAILED DESCRIPTION

Figure 1A:
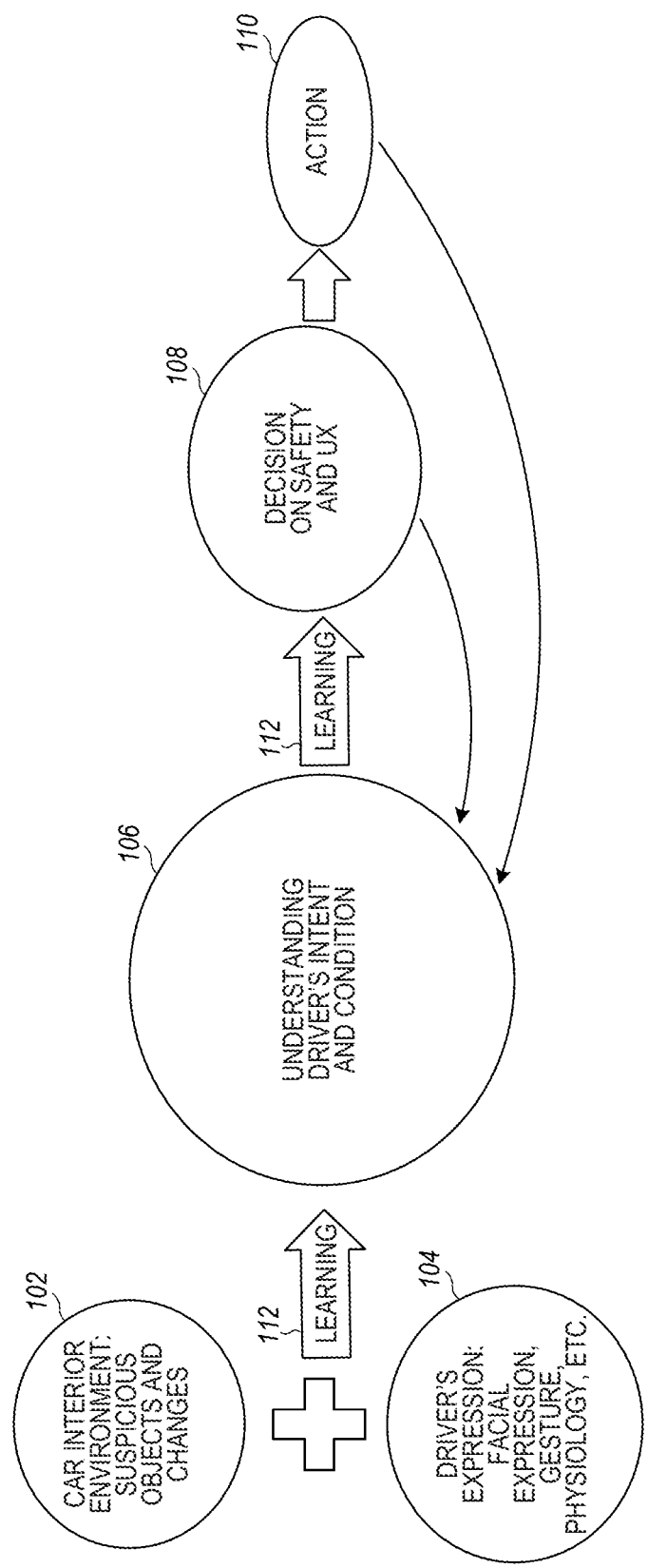
FIGS. 1A-1B are block diagrams of systems for detection of driver condition based on integrated information from driver expression and interior environment, to detect driver condition for safety, according to various embodiments.

In the following description, reference is made to the accompanying drawings that form a part hereof, and in which is shown by way of illustration specific embodiments which may be practiced. These embodiments are described in sufficient detail to enable those skilled in the art to practice the inventive subject matter, and it is to be understood that other embodiments may be utilized and that structural, logical and electrical changes may be made without departing from the scope of the present inventive subject matter. The following description of example embodiments is, therefore, not to be taken in a limited sense, and the scope of the present inventive subject matter is defined by the appended claims.

As vehicles each with an autonomous system are being developed for operation on public roads, the vehicles need to have layers of safety features to prevent collisions with other vehicles or fixed objects. A driver of a vehicle with an autonomous system may retain the ability to control the vehicle, and thus safety features should contemplate how driver input can impact overall vehicle safety.

Previous efforts have focused on understanding the external driving environment (e.g., traffic, signals and pedestrians) to enhance safety in autonomous driving. However, the present subject matter is related to understanding driver condition using driver expression and vehicle interior images, which are important in vehicles in which the driver has or can exercise control over the vehicle. In most vehicles that each have an autonomous system, the driver still has access to full control over the vehicle, and may pay less attention to safety, so driver condition is still an important consideration. In addition, unlike previous efforts, the present subject matter considers the connection between environmental features of the interior of the vehicle and driver condition. Other factors considered in determining driver condition include, but are not limited to, facial expression, gestures, speech and physiology.

The present subject matter integrates driver images and images from a vehicle's interior environment to determine and enhance safety in vehicles, such as vehicles that each have an autonomous system. A decision system is trained to identify driver expression based on interior environment features of a vehicle and decide if a warning should be given, in an embodiment. Various embodiments include, but are not limited to, a method to integrate detection results of facial expression and environment features of a vehicle interior, including calculating a cost function to maximize total safety, and to provide safety warnings to drivers. The present subject matter anticipates driving intent from driver's condition, reduces control from unsafe drivers, and promotes proper use of self-driving vehicles. Thus, the present subject matter provides the benefits of better understanding driver condition, and enhances safe vehicular travel for the driver, passenger and others that share the road with the vehicle. Additional benefits may include enhancing user experience, developing a database of driver experiences, and potentially providing lower insurance premiums and less potential liability for the vehicle owner.

Figure 1B:
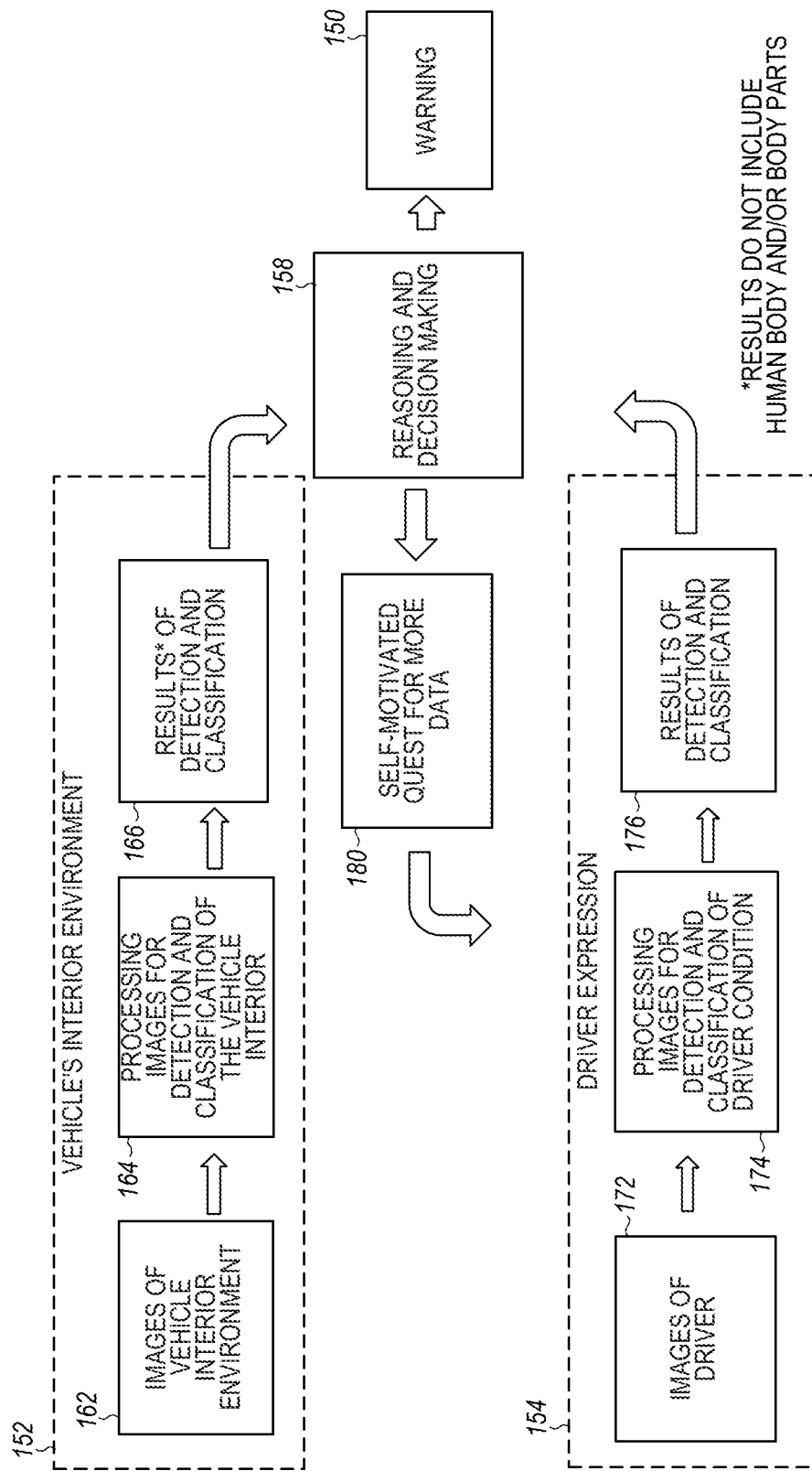

FIGS. 1A-1B are block diagrams of systems for detection of driver condition based on integrated information from driver expression and interior environment, to detect driver condition for safety, according to various embodiments. In the embodiment of FIG. 1A, images from a car interior environment 102 (including, for example, images of suspicious objects or environment changes) are analyzed in combination with data about the driver 104 (including, for example, facial expressions, gestures and physiology) to understand the driver's intent and condition 106. A machine learning method 112, or algorithm or network, is used to determine driver condition or intent and make a decision on safety 108, including whether or not to take an action 110. Possible actions 110 include providing a warning, limiting driver access to the controls of the vehicle, placing a call to 911, and providing a verbal warning including the identified type of danger, or any suitable combination thereof. Other actions or warnings can be provided without departing from the scope of the present subject matter. The driver's determined condition may include multiple classifications, such as being both drunk and drowsy, in various embodiments.

The present subject matter provides systematic integration, adaptive reasoning and decision-making, and an interactive warning system.

In FIG. 1B, a vehicle's interior environment 152 is classified using images of the vehicle interior 162 and that are processed at 164 to obtain results 166 of detection and classification of the vehicle's interior. The driver's expression 154 is classified using images of the driver 172 (and/or other sensor information), and processing for driver condition recognition 174 to obtain results 176 of detection and classification of driver condition. The results 166, 176 are combined using reasoning and decision making 158 (such as by using a machine learning method or network) to determine whether a warning 150 is provided, in an embodiment. In various embodiments, a self-motivated quest for more data 180 is provided to update and refine the classifications. Self-motivated learning includes a system or method that is motivated by itself, in its own interest, to learn, including requesting data, processing the data, and making a decision, in various embodiments.

Figure 2:
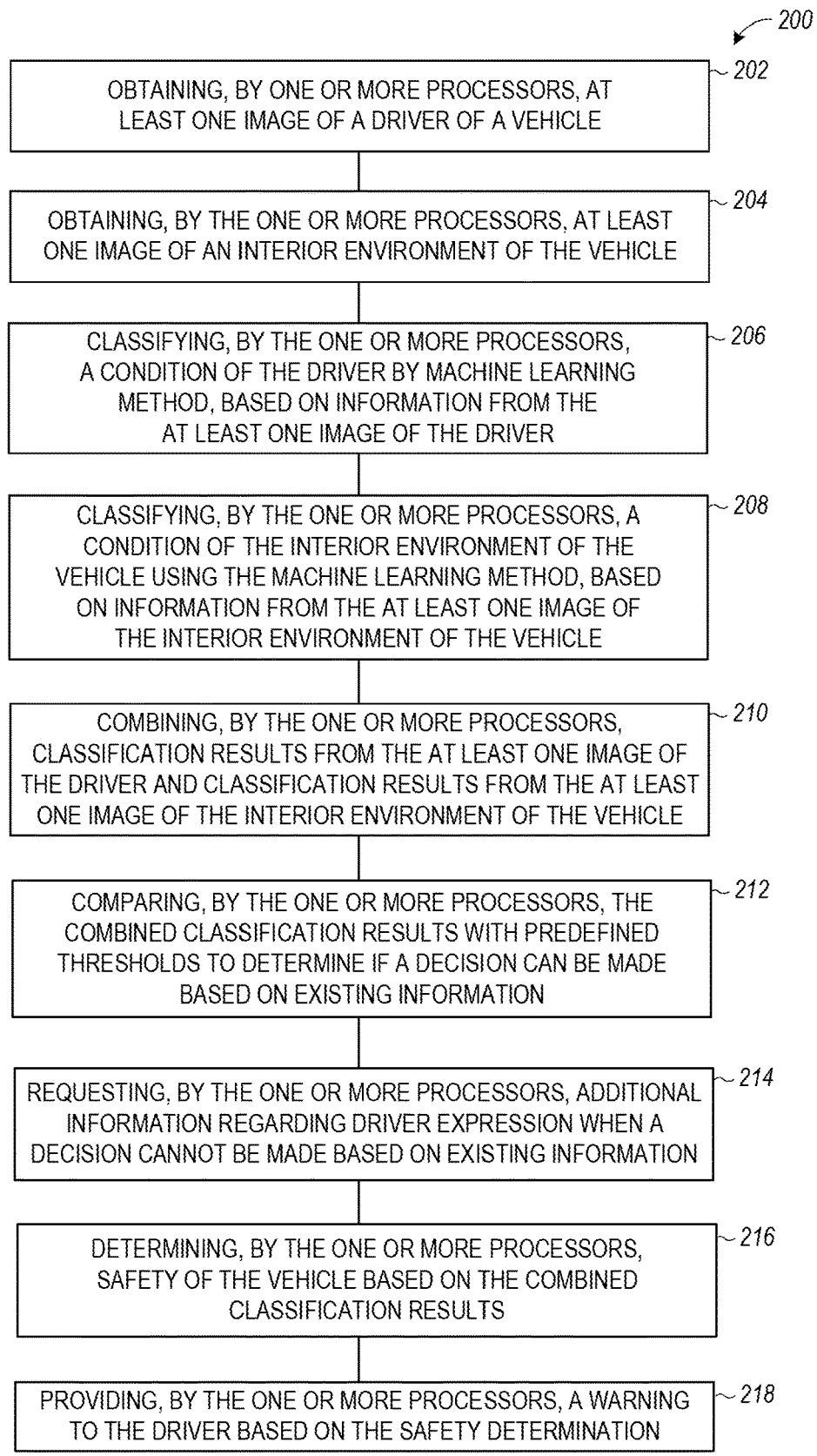
FIG. 2 is a flow diagram illustrating a computer-implemented method for providing a warning based on detection of driver condition based on integrated information from driver expression and interior environment for vehicles, according to various embodiments.

FIG. 2 is a flow diagram illustrating a computer-implemented method for providing a warning based on integrated driver condition recognition and interior vehicle environment for vehicles, according to various embodiments. The method 200 includes operations 202, 204, 206, 208, 210, 212, 214, 216 and 218. In operation 202, the method includes obtaining, by one or more processors, at least one image of a driver of a vehicle, and obtaining, by the one or more processors, at least one image of an interior environment of the vehicle in operation 204. Using a machine learning method, executing on the one or more processors, the at least one image of the driver is processed to classify a condition of the driver in operation 206 and the at least one image of the interior environment of the vehicle is processed to classify the interior environment of the vehicle in operation 208. In operation 210, the classification results from the at least one image of the driver and classification results from the at least one image of the interior environment of the vehicle are combined. In operation 212 the combined classification results are compared with predefined thresholds to determine if a decision can be made based on existing information, and additional information regarding driver expression is requested, if needed, in operation 214. Safety of the vehicle is determined based on the combined classification results in operation 216, and a warning is provided in operation 218 by the one or more processors to the driver based on the safety determination, in various embodiments.

In various embodiments, the method includes using a first machine learning method to process the at least one image of the driver and using a second machine learning method to process the image of the interior environment of the vehicle. In one embodiment, the image of the driver is part of a video and the processing of the image is part of processing the video. In one embodiment, the image of the interior environment of the vehicle is part of a video and the processing of the image is part of processing the video. Using a machine learning method to process the image or images of the driver and the image or images of the interior environment of the vehicle includes using layered activation maps, in various embodiments. In various embodiments, the vehicle is a vehicle with an autonomous system, and obtaining the image of the driver of the vehicle includes obtaining the image of the driver of the vehicle with the autonomous system. The method also includes using a self-motivated algorithm to obtain additional data for the machine learning method, in various embodiments. In one embodiment, using the machine learning method to process the image of the driver includes using speech of the driver. In one embodiment, using the machine learning method to process the image or images of the driver includes using facial expressions of the driver. In one embodiment, using the machine learning method to process the image or images of the driver includes using gestures of the driver. In one embodiment, using the machine learning method to process the image or images of the driver includes using physiological information of the driver.

Another aspect of the present subject matter provides a warning device including a non-transitory memory storage comprising instructions and one or more processors in communications with the memory storage. The one or more processors execute the instructions to obtain an image of a driver of a vehicle, obtain an image of an interior environment of the vehicle, use a machine learning method to process the image of the driver and the image of the interior environment to classify a condition or state of the driver and reach a determination of safety, and provide a warning to the driver based on the safety determination.

In various embodiments, the machine learning method is configured to process the interior environment image to classify the interior environment including identifying a phone with text on a display. The machine learning method is configured to process the interior environment image to classify the interior environment including identifying alcohol or drugs, in various embodiments. In one embodiment, the machine learning method is configured to process the interior environment image to classify the interior environment including identifying a weapon.

A further aspect of the present subject matter provides a non-transitory computer-readable medium storing computer instructions for providing a warning, that when executed by one or more processors, cause the one or more processors to perform steps of a method. The steps include processing images of an interior environment of vehicle with an autonomous system for classification of the environment, and processing images of a driver of the vehicle with the autonomous system for condition recognition of the driver. The steps also include using a machine learning method to predict intent of the driver based on results of the environment classification and the condition recognition, using a self-motivated algorithm to obtain additional data for environment classification and condition recognition, and providing a warning to the driver based on the predicted intent of the driver, in various embodiments.

In one embodiment, processing images of a driver of the vehicle with an autonomous system for condition recognition of the driver includes recognizing a distracted driver. Processing images of a driver includes recognizing a drunk driver, in an embodiment. In one embodiment, processing images of a driver includes recognizing a drowsy driver. Processing images of a driver includes recognizing a frustrated driver, in an embodiment.

Figure 3A:
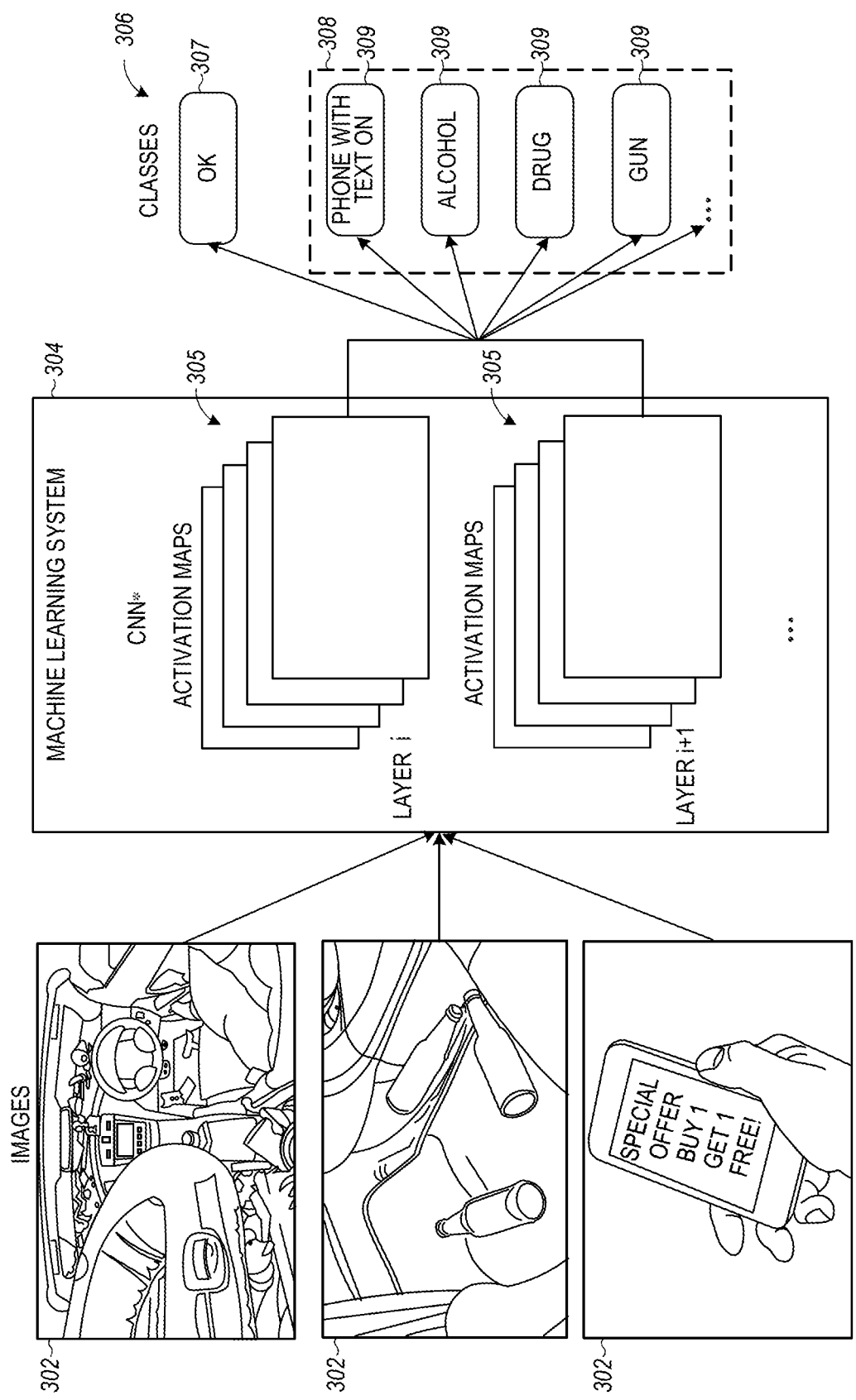
FIG. 3A is a flow diagram illustrating a method for the classification of an interior vehicle driving environment, according to various embodiments.
Figure 3B:
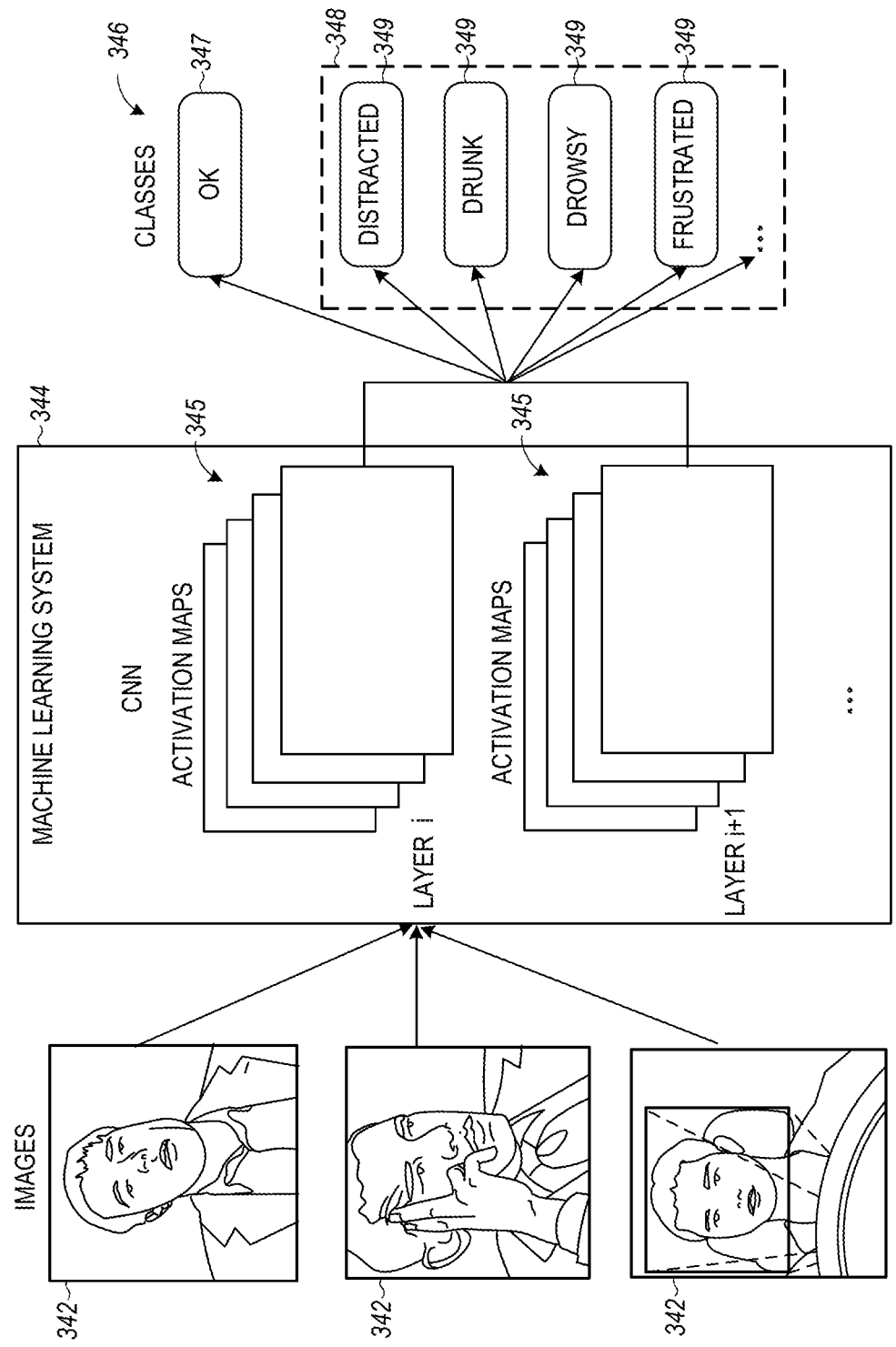
FIG. 3B is a flow diagram illustrating a method for the classification of driver facial expression, according to various embodiments.

FIG. 3A is a flow diagram illustrating a method for the classification of interior vehicle driving environment, according to various embodiments. FIG. 3A includes images 302, a machine learning system 304, activation maps 305, classes 306, okay indication 307, problem or issue indication 308, and issue indications 309. The machine learning system 304 (or network, or method) is used to evaluate the interior driving environment using images 302 of the vehicle interior, and to classify the environment into one or more classes 306. In one embodiment, two machine learning systems are used, one for classifying the interior environment (FIG. 3A) and one for classifying the driver's condition or facial expression (FIG. 3B). In other embodiments, a single machine learning system is used for both interior environment classification and driver expression. In various embodiments, the images 302 include still images, videos, or other types of sensor data. The machine learning system 304, network, or method includes multiple layers of activation maps 305, in various embodiments. In one embodiment, the machine learning system 304, network, or method is a convolutional neural network (CNN). In various embodiments, the interior vehicle environment is classified into one or more classes 306, including a class that indicates that the environment is okay 307 (with no visible problem or issue) and a class that indicates a problem or issue 308 has been identified. Identified issues 308 may include a phone with text or other application being used, alcohol, drugs or a gun 309. Other issues 308 can be identified without departing from the scope of the present subject matter.

FIG. 3B is a flow diagram illustrating a method for the classification of driver facial expression, according to various embodiments. FIG. 3B includes images 342, a machine learning system 344, activation maps 345, classes 346, okay indication 347, problem or issue indication 348, and issue indications 349. The machine learning system 344, network, or method is used to evaluate the driver's condition or facial expression using images 342 of the driver of the vehicle, and classify the driver's condition or facial expression into one or more classes 346. In various embodiments, the images 342 include still images, videos, or other types of sensor data. The machine learning system 344, network, or method includes multiple layers of activation maps 345, in various embodiments. In one embodiment, the machine learning system 344 is a convolutional neural network (CNN). In various embodiments, the driver's condition or facial expression is classified into one or more classes 346, including a class that indicates that the driver is okay 347 (with no visible problem or issue) and a class that indicates a problem or issue 348 has been identified. Identified issues 348 may include a distracted, drunk, drowsy or frustrated driver 349. Other issues 348 can be identified without departing from the scope of the present subject matter. Facial expression is an example of processing one type of driver expression, and other types of driver expression or intent can be processed using the present subject matter.

Figure 4:
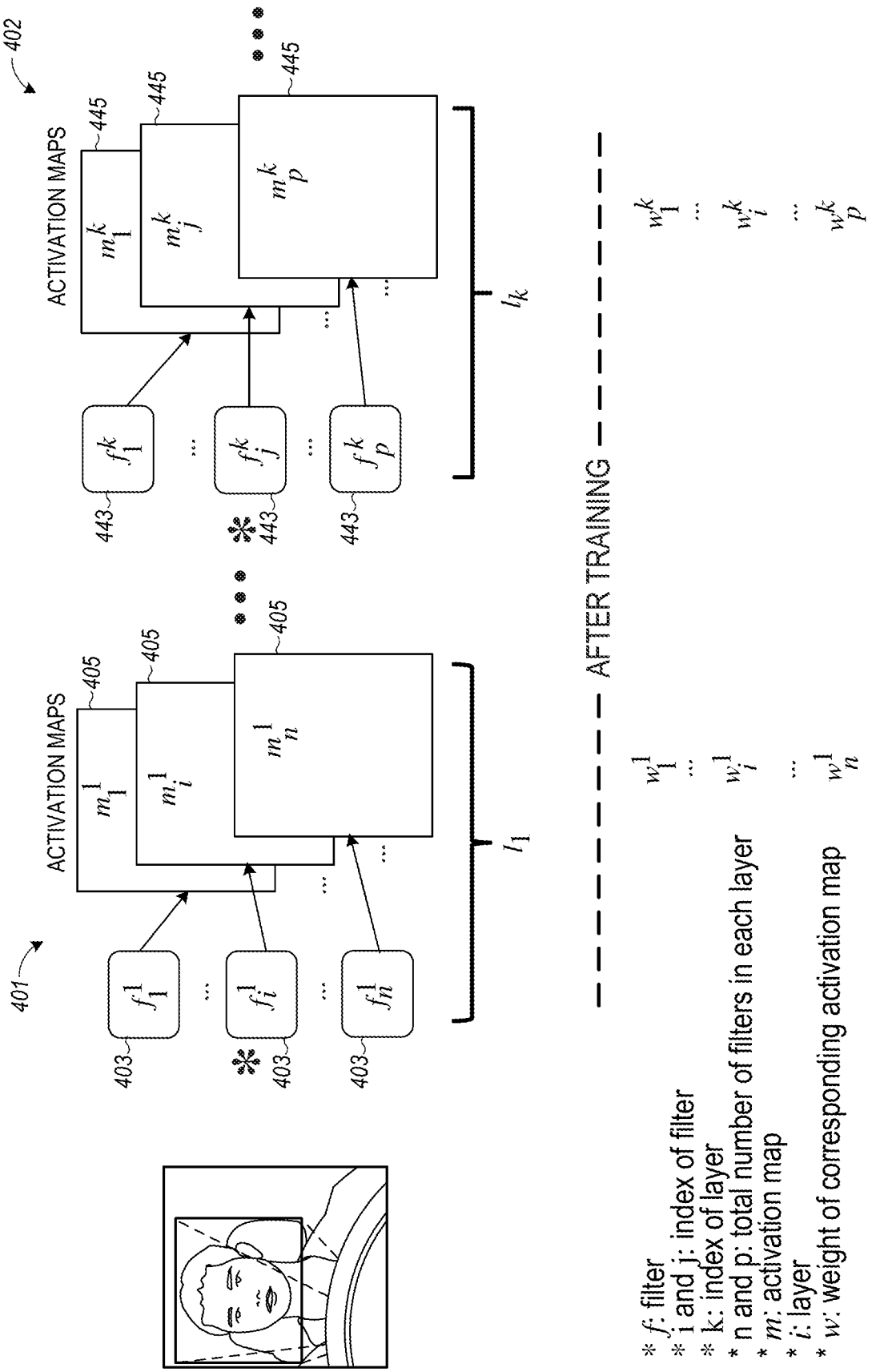
FIG. 4 is a block diagram illustrating the use of a machine learning method for processing driver images and interior vehicle environment images, according to various embodiments.

FIG. 4 is a block diagram illustrating the use of a machine learning method, such as a CNN, for processing driver images and interior vehicle environment images, according to various embodiments. FIG. 4 includes a first learning layer 401 and an additional learning layer 402. Further layers can be used without departing from the scope of the present subject matter. The first learning layer 401 includes filters 403 and activation maps 405, and the additional learning layer 402 includes filters 443 and activation maps 445. In the depicted embodiment, the following variables are used: filter (f), index of filter (i and j), index of layer (k), total number of filters in each layer (n and p), activation map (m), layer (l), and weight of corresponding activation map (w).

Figure 5A:
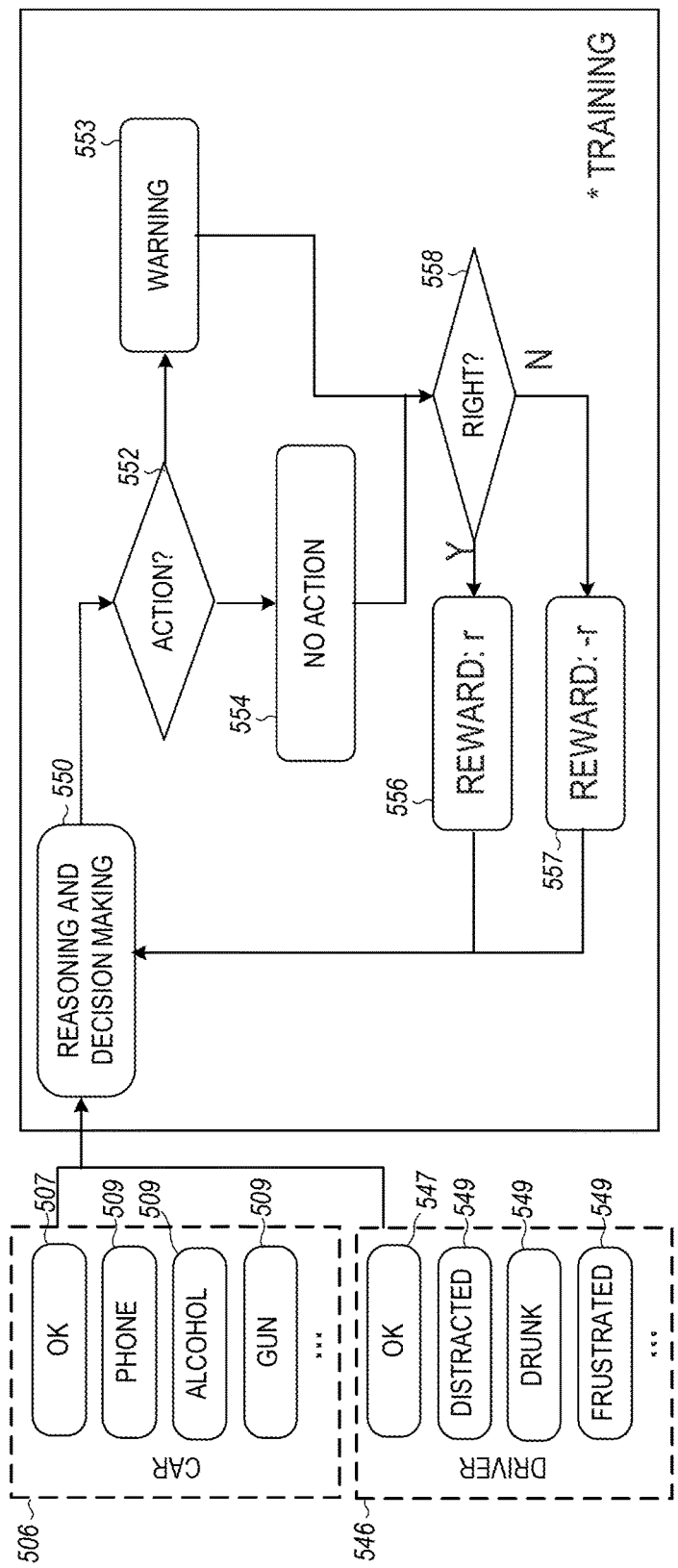
FIGS. 5A-5C are flow diagrams illustrating reasoning and decision making for the integration of driver expression recognition and interior vehicle environment classification for vehicles, according to various embodiments.
Figure 5B:
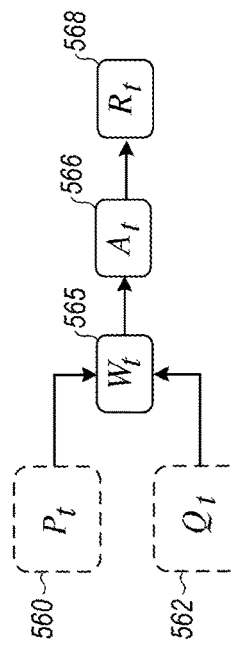
Figure 5C:
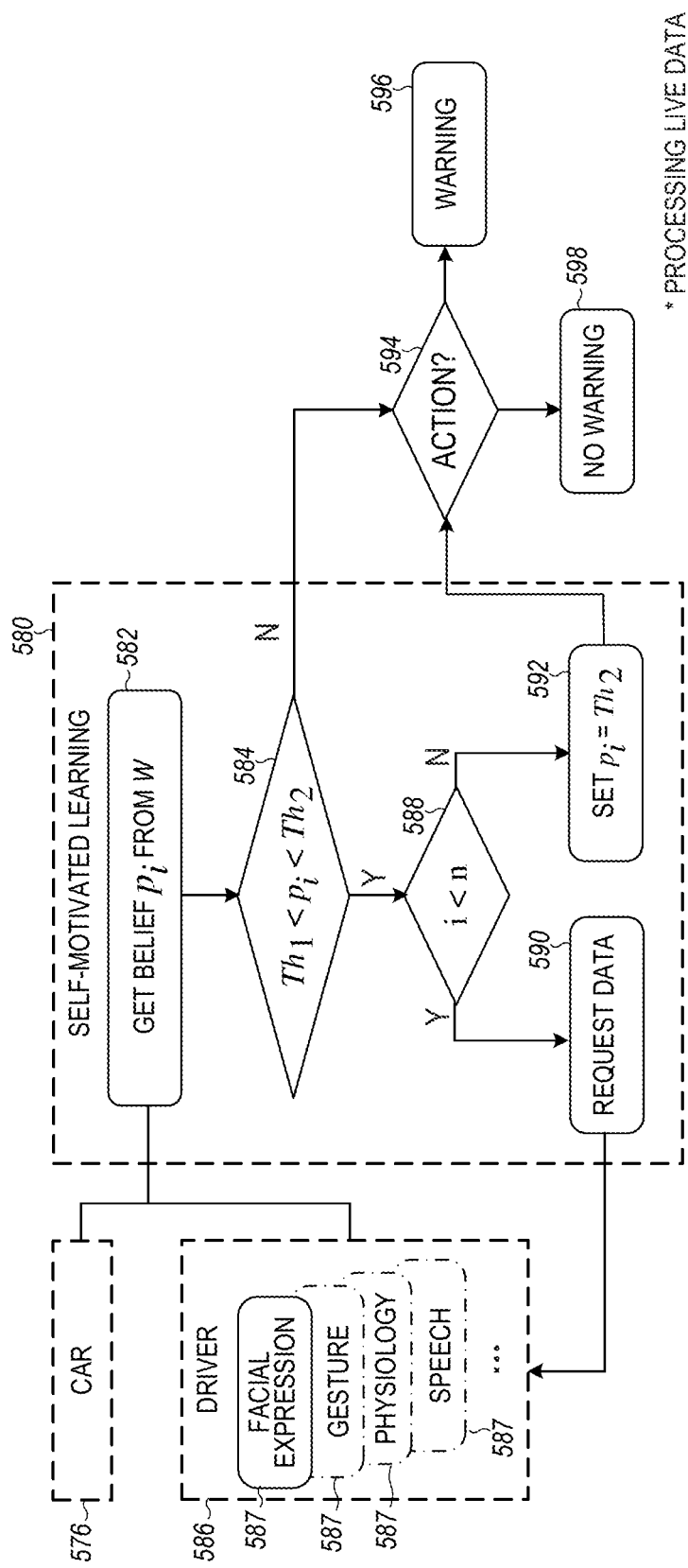

FIGS. 5A-5C are flow diagrams illustrating reasoning and decision making for the integration of driver condition recognition and interior vehicle environment classification for vehicles, according to various embodiments. In FIG. 5A, the results 506, 507, and 509 of classification of the interior vehicle environment and the results 546, 547, and 549 of classification of the driver expression are combined using reasoning and decision making 550 to determine whether to take no action 554 or take an action 552. If an action 552 is deemed appropriate, a warning 553 is given to the driver. The warning 553 can be visual, auditory, tactile, or some combination in various embodiments. A determination is made using a machine learning system at 558 whether the reasoning and decision making 550 was correct, and a reward is either added (556) or subtracted (557) as feedback for future reasoning and decision making, in various embodiments. The process of FIG. 5A can be used during training, prior to deployment, or during use of the vehicle, in various embodiments.

FIG. 5B illustrates a flow diagram for a portion of the reasoning and decision making 550 used in FIG. 5A. For the input $t^{th}$ set of interior vehicle environment images or driver expression images, the inputs include $P_t$, a vector 560 of probabilities for classes of the interior vehicle environment, and $Q_t$, a vector 562 of probabilities for classes of driver expression. A correlation coefficient matrix $W_t$ 564 with weights that indicate the relationship between vehicle interior environment and driver expression is used to combine the input vectors 560, and 562 using a formula:

$$f(P_t W_t Q_t) => A_t => R_t$$
$$F = \operatorname*{argmax}_{W} \sum R_t \text{ (from } t = 1 \text{ to } N\text{),}$$

solving for W using backpropagation in the neural network, assuming the discount for each reward is 1, where:

$A_t$ 566 is the rectification result after using rectifier f, $R_t$ 568 is the reward $\{-1, 1\}$, where 1 means the result equates with a human label and −1 means the result differs from the human label in training. In various embodiments, W changes in each iteration, and thus $W_t$ is used in the depicted example.

FIG. 5C illustrates a flow diagram for a portion of the reasoning and decision making 550 used in FIG. 5A, including using self-motivated learning 580. Inputs include vehicle interior environment data 576 and driver condition data 586, which includes but is not limited to data 587 related to facial expression, gestures, physiology and speech of the driver of the vehicle. The self-motivated learning 580 receives the inputs and belief $p_i$, and compares it to thresholds $Th_1$ and $Th_2$ at 584, and $Th_1 < Th_2$. If not within the thresholds, an action is determined at 594. If $p_i$ is larger than or equal to $Th_2$, a warning is given at 596, otherwise no warning is given at 598. If within the thresholds, a comparison is done at 588 to determine if the maximum number of trials (n) has not been reached. If the maximum number of trials has not been reached, the self-motivated learning requests more data at 590. Otherwise, the threshold is adjusted to $Th_2$ at 592 and an action is determined at 594. The depicted embodiment uses the following variables:

$p_i \in [0, 1]$: belief in driving dangerousness
n: maximum number of trials
i: number of trials
$p'_i$: new belief obtained from additional data
α and β: predefined parameters
$Th_1$ and $Th_2$: thresholds where the self-motivated learning includes:

$Th_1 < p_i < Th_2$ to determine quest for more data
$p_i \leq Th_1$, $p_i \geq Th_2$, to determine whether to go to action
$p_i = \alpha p_i + \beta p'_i$, to update $p_i$ with new data, and
if $p_i < Th_2$, no warning is given, but
if $p_i \geq Th_2$, a warning is given.

Figure 6:
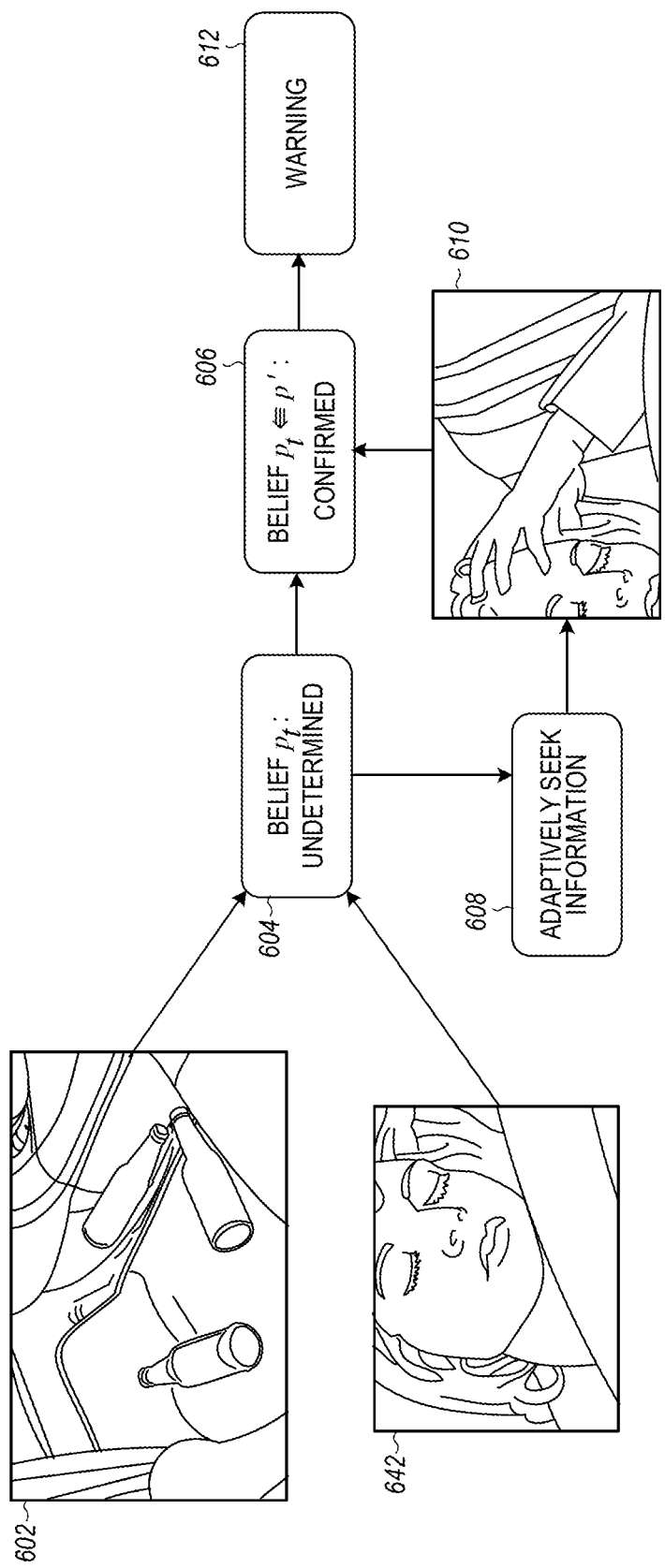
FIG. 6 is a flow diagram illustrating adaptive self-motivated learning for integrated driver expression recognition and interior vehicle environment classification for vehicles, according to various embodiments.

FIG. 6 is a flow diagram illustrating adaptive self-motivated learning for integrated driver condition recognition and interior vehicle environment classification for vehicles, according to various embodiments. The images of the vehicle interior 602 and driver facial expression 642 are used as inputs, and if the belief is undetermined 604 from the functions of FIGS. 5A-5C, additional information is adaptively sought at 608, including additional inputs of gesture 610 for example. When the belief is confirmed 606, a decision on a warning is made 612, in various embodiments. A warning is provided when suspicious objects in the vehicle interior and/or a predetermined negative driver intent is detected, in various embodiments.

Figure 7:
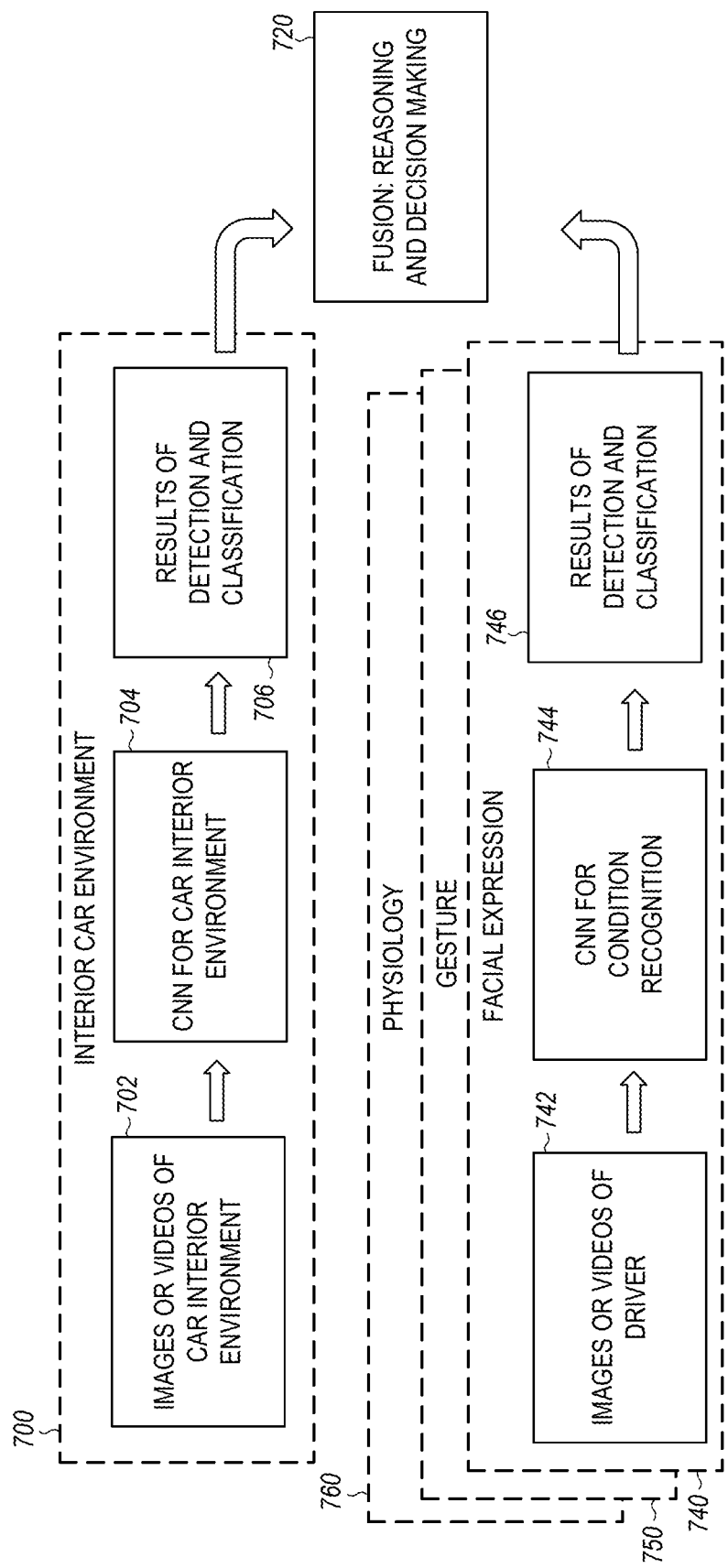
FIG. 7 is a block diagram illustrating data used for integrated driver expression recognition and interior vehicle environment classification, according to various embodiments.

FIG. 7 is a block diagram illustrating data used for integrated driver expression recognition and interior vehicle environment classification, according to various embodiments. Data from the interior car environment 700 includes images of vehicle interior environment 702, which is processed using a machine learning method 704 to obtain results 706 of detection and classification. Regarding driver condition or intent, facial expression data 740 includes images of the driver 742, which is processed using a machine learning method 744 to obtain results 746 of detection and classification of driver condition. Additional data for driver condition or intent, such as driver gestures 750 and physiology 760, may also be used. The results 706, 746 are fused 720 using the reasoning and decision making 550 described in FIGS. 5A-5C, in various embodiments.

Thus, the present subject matter provides a systematic design to understand driver intent and condition by integrating both driver expression and interior vehicle environment using machine learning methods and runtime self-motivated learning, to enhance safety in vehicles. The neural network is used to extract a relationship between interior vehicle environment images and driver condition, in an embodiment. The self-motivated learning is used to pool effectively the minimum data for decision making, and can decide if additional information is needed to make a decision. In various embodiments, an adaptive decision system is trained to reason driver expression using a cost function based on images of the driver and environmental features to decide if a warning should be given.

The functions or algorithms described herein may be implemented in software in one embodiment. The software may consist of computer-executable instructions stored on computer-readable media or a computer-readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 8:
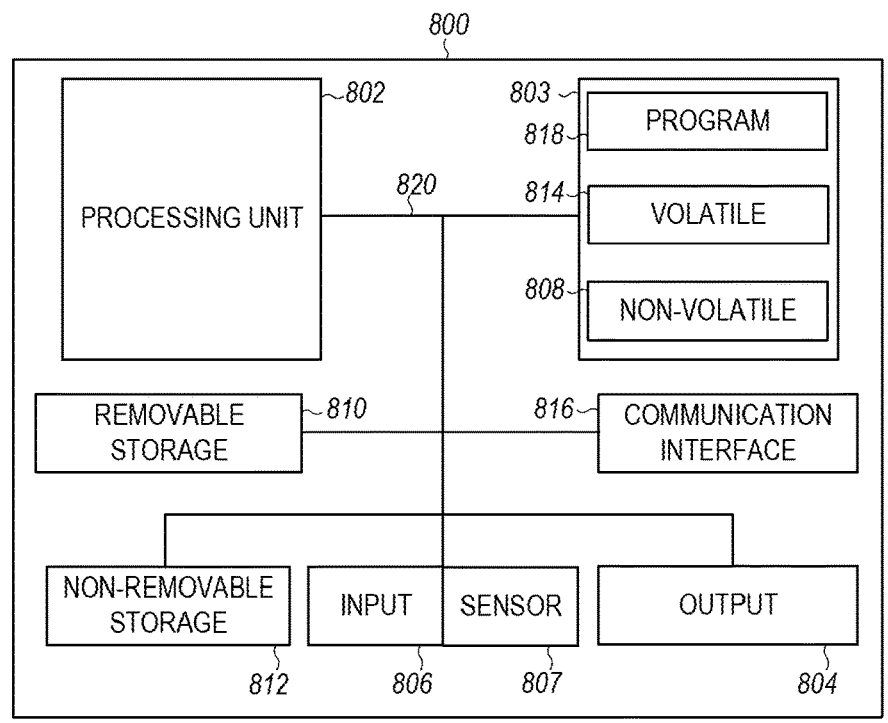
FIG. 8 is a diagram illustrating circuitry for implementing devices to perform methods according to an example embodiment.

FIG. 8 is a schematic diagram illustrating circuitry for performing methods according to example embodiments. All components need not be used in various embodiments. For example, the computing devices may each use a different set of components and storage devices.

One example computing device in the form of a computer 800 may include a processing unit 802, memory 803, removable storage 810, and non-removable storage 812 coupled by a bus 820. Although the example computing device is illustrated and described as computer 800, the computing device may be in different forms in different embodiments. For example, the computing device may instead be a smartphone, a tablet, smartwatch, router, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 800, the storage may also or alternatively include cloud-based storage accessible via a network, such as the Internet or server-based storage.

In FIG. 8, memory 803 may include volatile memory 814 and/or non-volatile memory 808. Computer 800 may include—or have access to a computing environment that includes—a variety of computer-readable media, such as volatile memory 814 and/or non-volatile memory 808, removable storage 810 and/or non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Storage can also include networked storage such as a storage area network (SAN).

According to another aspect of the present disclosure, a non-transitory computer-readable medium stores computer instructions for providing a warning, that when executed by one or more processors, cause the one or more processors to perform steps of a method. The steps include obtaining at least one image of a driver of a vehicle, obtaining at least one image of an interior environment of the vehicle, classifying a condition of the driver by machine learning method, based on information from the at least one image of the driver, classifying a condition of the interior environment of the vehicle using the machine learning method, based on information from the at least one image of the interior environment of the vehicle, combining classification results from the at least one image of the driver and classification results from the at least one image of the interior environment of the vehicle, comparing the combined classification results with predefined thresholds to determine if a decision can be made based on existing information, requesting additional information regarding driver expression when a decision cannot be made based on existing information, determining safety of the vehicle based on the combined classification results, and providing a warning to the driver based on the safety determination.

Optionally, in any of the preceding aspects, the machine learning method includes a general CNN and a CNN using adaptive filters, wherein the use of the adaptive filters is adjusted based on trained results of parameters, and wherein the adaptive filters are applied to the at least one image of the interior environment of the vehicle and are also applied to activation maps from upper level layers in the CNN. Optionally, in any of the preceding aspects, a self-motivated algorithm is used to obtain additional data for the machine learning method. Optionally, in any of the preceding aspects, classifying a condition of the driver of the vehicle includes recognizing at least one of a distracted driver, a drunk driver, a drowsy driver, and/or a frustrated driver. Optionally, in any of the preceding aspects, the method includes using a first machine learning method to process the at least one image of the driver and using a second machine learning method to process the image of the interior environment of the vehicle.

Optionally, in any of the preceding aspects, the at least one image of the driver includes an image and part of a video and the processing of the at least one image includes processing the image and the part of the video. Optionally, in any of the preceding aspects, the at least one image of the interior environment of the vehicle includes an image and part of a video and the processing of the at least one image includes processing the image and the part of the video. Using a machine learning method to process the at least one image of the driver and the at least one image of the interior environment of the vehicle includes using activation maps in layers of the machine learning method, optionally, in any of the preceding aspects. Optionally, in any of the preceding aspects, the vehicle is a vehicle with an autonomous system, and obtaining the at least one image of the driver of the vehicle includes obtaining the at least one image of the driver of the vehicle with the autonomous system. Optionally, in any of the preceding aspects, the method includes using a self-motivated algorithm to obtain additional data for the machine learning method. A self-motivated algorithm includes a system or method that is motivated by itself, in its own interest, to learn, including request for data, process the data, and make a decision, in various embodiments. Optionally, in any of the preceding aspects, the machine learning method is used to combine information from the at least one image of the driver and the at least one image of the interior environment of the vehicle, and to make the safety determination. Optionally, in any of the preceding aspects, using the machine learning method to process the image of the driver includes using speech of the driver, facial expressions of the driver, gestures of the driver, and/or physiological information of the driver. Optionally, in any of the preceding aspects, comparison methods and thresholds are used to make the safety determination.

Computer 800 may include or have access to a computing environment that includes input 806, output 804, and a communication interface 816. In various embodiments, communication interface 816 includes a transceiver and an antenna. Output 804 may include a display device, such as a touchscreen, that also may serve as an input device. The input 806 may include one or more of a touchscreen, touchpad, mouse, keyboard, camera, one or more device-specific buttons, one or more sensors 807 integrated within or coupled via wired or wireless data connections to the computer 800, or other input devices. The computer 800 may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions, i.e., a program 818, comprises instructions stored on a computer-readable medium that are executable by the processing unit 802 of the computer 800. The terms "computer-readable medium" and "storage device" do not include carrier waves to the extent carrier waves are deemed too transitory.

In one example, the processing unit 802 executes the program 818 to implement a warning method for the safety of a vehicle with an autonomous system. One or more processors obtain an image of a driver of a vehicle and an image of an interior environment of the vehicle. Using a machine learning method executing on the one or more processors, the image of the driver and the image of the interior environment of the vehicle are processed to classify a condition or state of the driver and provide a determination of safety. A warning is provided to the driver using the one or more processors based on the safety determination.

In various embodiments, the sensors 807 include in-vehicle sensors that may be mounted inside the vehicle and are coupled to and provide the processing unit 802 with updates as to driver condition and interior environment of the vehicle. For example, the in-vehicle sensors may include aural devices (e.g., microphones, speakers), haptic sensors (e.g., vibration), image sensors such as cameras or video recorders, seat sensors to determine if a weight is on a particular seat, and temperature sensors as well as any other sensor that may be used to assist in determining driver environment or condition.

Figure 9:
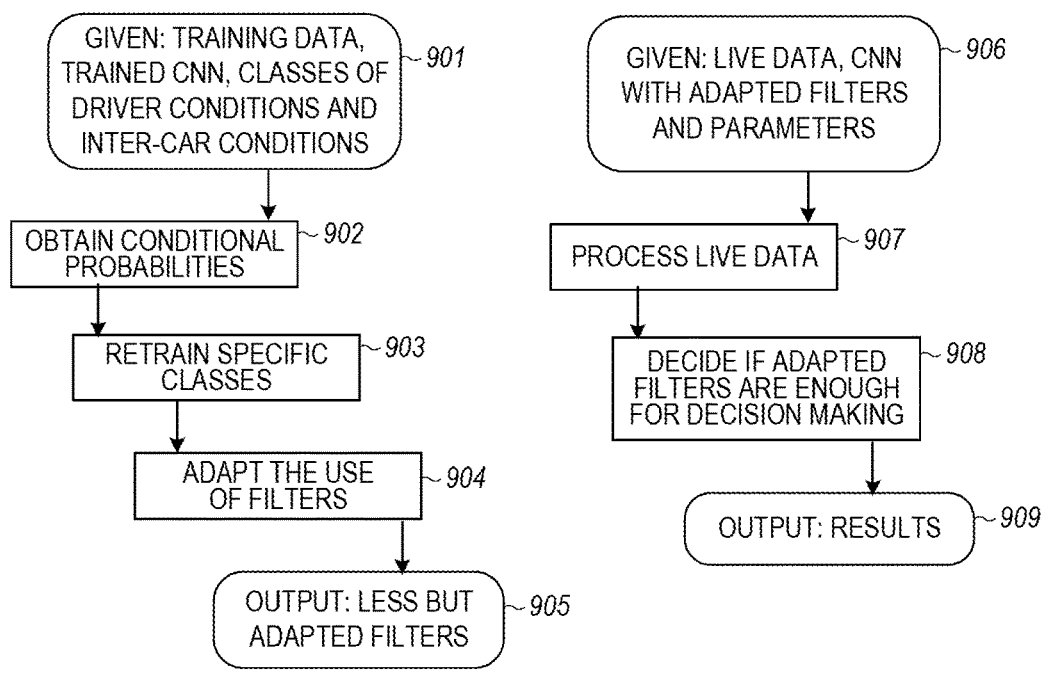
FIG. 9 is a flow diagram illustrating a design for CNN with adaptive filters, according to various embodiments.

FIG. 9 is a flow diagram illustrating a design for CNN with adaptive filters, according to various embodiments. Training data, trained CNN, classes of driver conditions, and classes of interior environment conditions are inputs 901. In various embodiments, conditional probabilities are calculated using the input data 902. Based on the conditional probability, CNN is retrained to update parameters of interior environment conditions when driver conditions are given 903. The parameters of the filters that have less influence to final results (below a threshold) are set to zeroes 904. The output includes active filters 905, or filters with nonzero parameters. When the inputs are live data 906, the method processes the data 907, decides whether to use adapted filters 908, and provides an output 909.

Figure 10:
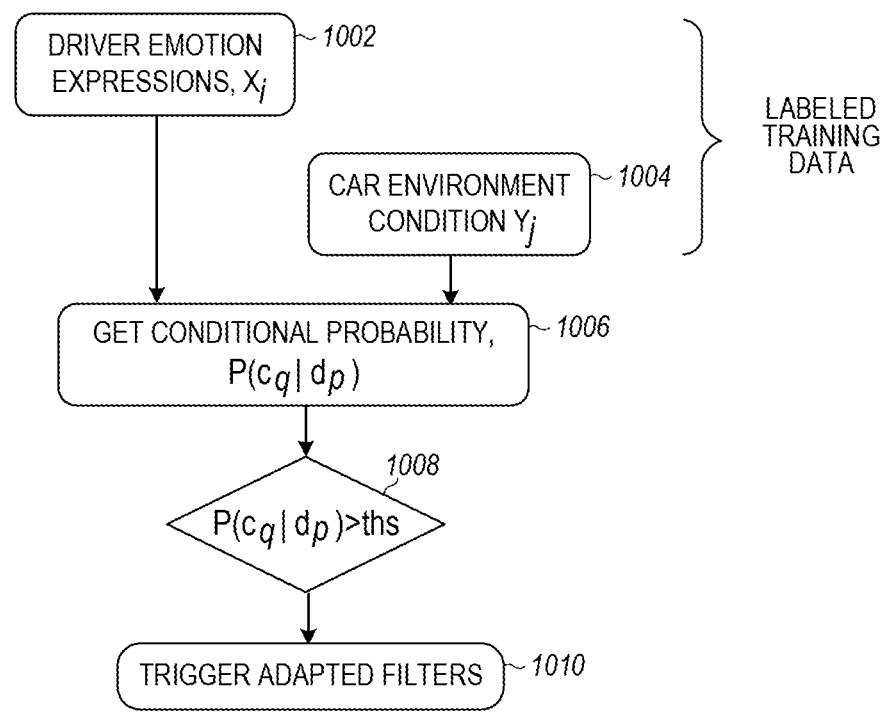
FIG. 10 is a flow diagram illustrating the calculation of conditional probability of interior environment condition given driver condition, according to various embodiments.

FIG. 10 is a flow diagram illustrating the calculation of conditional probability of interior environment condition given driver condition, according to various embodiments. For the training data of driver emotion expressions $X_i$ 1002 and car environment condition $Y_j$, 1004, conditional probability is calculated 1006 using the following formulas:

$$P(c_q \mid d_p) = \frac{P(c_q \cdot d_p)}{P(d_p)}$$

where $$P(d_p) = \frac{\sum_{i, f(X_i) = d_p} g_i}{\sum_i g_i} \text{ and}$$

$$P(c_q \cdot d_p) = \frac{\sum_{i, f(X_i) = d_p, f(Y_i) = c_q} g_i}{\sum_i g_i}.$$

Assuming the number and type of classes are fixed, the higher the conditional probability, the more possible the $c_q$ given $d_p$. The depicted embodiment uses the following variables:

$V_i = (X_i, Y_i)$: a pair of labeled datasets, where i is the index, $X_i$ and $Y_i$ are datasets of driver conditions and interior environment conditions, respectively. A dataset can be one or more images, or videos, using the following variables:

$G = (g_1, g_2, \ldots, g_i, \ldots)$: labels of each pair of datasets, where $g_i = \{0,1\}$, 1 presents human labeled as dangerous, and 0 as not dangerous.

$D = (d_1, d_2, \ldots, d_p, \ldots)$: classes of driver condition, and p is index.

$C = (c_1, c_2, \ldots, c_q, \ldots)$: classes of interior environment condition, and q is index.

f: classification of $X_i$, or $Y_i$.

$P(c_q \in C \mid d_p \in D)$: or simply $P(c_q \mid d_p)$, conditional probability of interior environment condition given driver condition.

ths: threshold value.

Given the driver condition, the number of active filters needed for detection of interior environment conditions can be reduced. Reducing the active filters has the following advantages: uses the same CNN structure instead of building a new one; reduces active filters; reduces computation complexity; reduces computation time; and avoids overfitting in machine learning.

When the input data are about driver's condition $d_p$, the classification results change from C to $C_{d_p}$, which is equivalent to set the results of $\overline{C_{d_p}}$ to 0.

A general equation for backpropagation is:

$$W' = W - \eta \nabla W \text{ and } \nabla W = \frac{\partial}{\partial W} F(W, b; V, C).$$

Given the conditional probability with $d_p$, the output classes can be reduced to $C_{d_p}$. In order to take advantages from the reduced output classes but using the same CNN, one can retrain the CNN to get a new set of W for the specific $d_p$ and $C_{d_p}$, i.e., $$\nabla W = \frac{\partial}{\partial W} F(W, b; V, C_{d_p}).$$

According to chain rule, $\nabla w_a^k$ can be deduced to a function of $$\frac{\partial o_e^k}{\partial w_a^k},$$

i.e., $$\nabla w_a^k \Rightarrow g\left(\frac{\partial o_e^k}{\partial w_a^k}\right), \quad (1)$$

where g is a function. When the output is 0, this term is set to 0 in training, which will lead to a zero $\nabla w_a^k$, i.e., $w_a^k$ will not be updated. In this case, $w_a^k$ can be seen as part of the bias, and set it as zero in initialization, i.e., do not use the corresponding filter of $w_a^k$.

This formula is applied to the outputs directly connected to the current layer, thus, in implementation during training, one can propagate this method layer by layer. Specifically, starting from the last layer, for each layer, if the layer output $\nabla o_e^k \leq $ thr_st for z times, i.e., it is relatively stable in convergence; $o_e^k \leq $ thr_out, set $o_e^k = 0$, i.e., not using the corresponding filters, and where both thr_st and thr_out are thresholds. This comparison to thresholds 1008 determines whether to trigger adaptive filters 1010.

The depicted embodiment uses the following variables:

$C_{d_p} = (c_{d_{p1}}, c_{d_{p2}}, \ldots, c_{d_{pr}}, \ldots)$: classes of interior environment condition corresponding to $d_p$ with $P(c_{d_{pr}} \mid d_p)$ always larger than the threshold, i.e., $P(c_{d_{pr}} \mid d_p) >$ ths, and r is an index. $C_{d_p}$ is a subset of C, i.e., $C_{d_p} \subseteq C$ and $c_{d_{pr}} \in C$.

$\overline{C_{d_p}} \subseteq C$, $\overline{C_{d_p}} \cap C_{d_p} = \emptyset$, and $c_{d'_{pr}} \cup C_{d_p} = C$.

W: weights of CNN

F: cost function b: bias $w_a^k$: weight (parameters) for layer k and filter f $o_e^k$: output connected with $w_a^k$. Note that an output can be connected with multiple weights.

Figure 11:
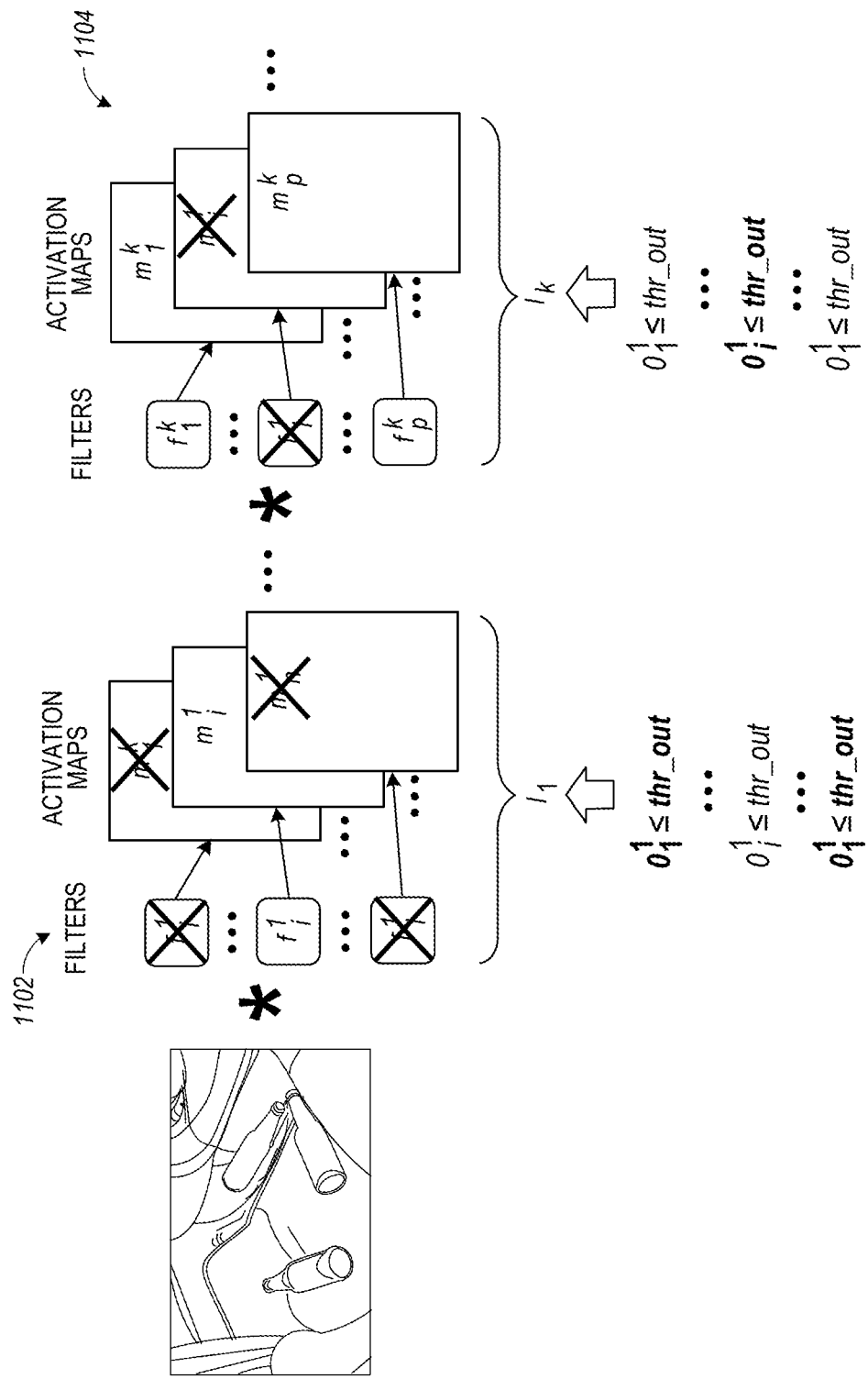
FIG. 11 is a block diagram illustrating the use of CNN with adaptive filters for processing interior vehicle environment images, according to various embodiments.

FIG. 11 is a block diagram illustrating the use of CNN with adaptive filters for processing interior vehicle environment images, according to various embodiments. The notation "X" indicates the inactive filters in the depicted embodiment. An inactive filter is a filter that has parameter as zero. $o_e^k$ is an output of current layer, and thr_out is a threshold.

According to various embodiments, the CNN is retrained 1102 to use the given condition $P(c_q|d_p)$>ths. During processing the live data 1104, if the output belongs to one of the classes $C_{d_p}$, then that class will be send to next step for reasoning and decision making. Otherwise, the input data cannot be classified into one of the classes that have $P(c_q|d_p)$>ths.

This method can also be applied to the situation that filters are undetermined at the beginning of training a CNN but can tried out as many filters as possible, and eventually it retains only the filters that have significant influence to the results.

Figure 12:
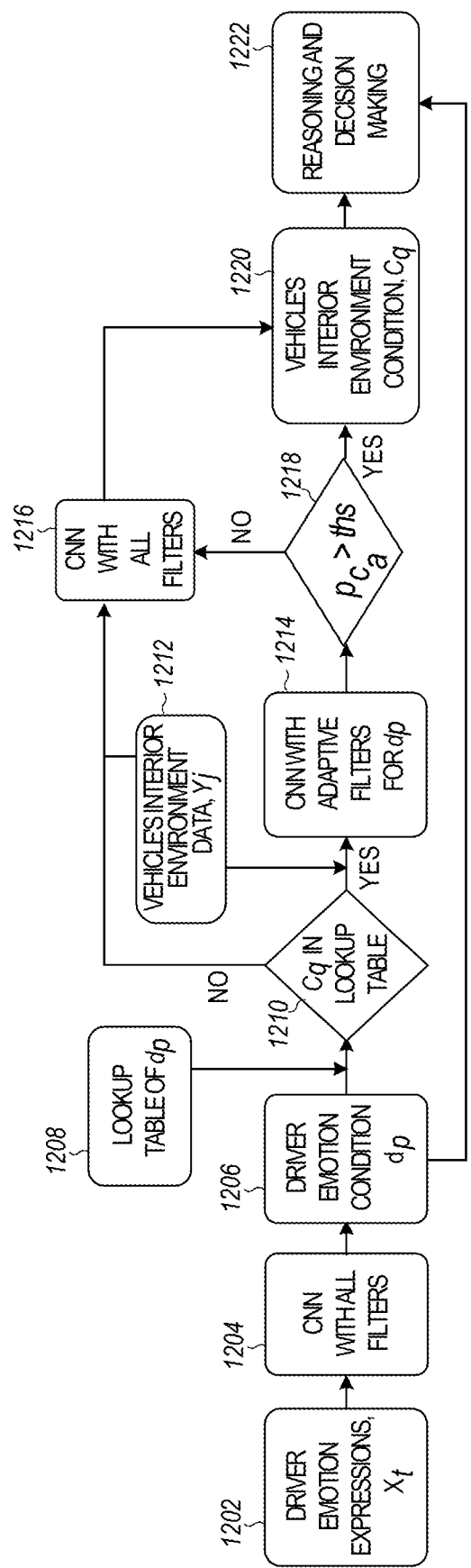
FIG. 12 is a flow diagram illustrating a method of processing live data using CNN with adaptive filters, according to various embodiments.

FIG. 12 is a flow diagram illustrating a method of processing live data using CNN with adaptive filters, according to various embodiments. The driver emotion expression data 1201 are processed using CNN with all filters 1204, in various embodiments. Given the driver emotion condition 1206 and using a lookup table 1208, if interior environment condition is in the lookup table 1210, interior environment condition data 1212 are processed using CNN with adaptive filters 1214. A lookup table 1208 is a table that has $d_p$ and corresponding $c_q$ with $P(c_q|d_p)$>ths. If the interior environment condition is not in the lookup table, or the output belief from CNN with adaptive filters is less than a threshold value 1218, the interior environment condition data are processed using CNN with all filters 1216. The conditions of driver and interior environment 1220 are sent to the method of reasoning and decision making 1222, in various embodiments.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A computer-implemented warning method, comprising:
obtaining, by one or more processors, at least one image of a driver of a vehicle;
obtaining, by the one or more processors, at least one image of an interior environment of the vehicle;
classifying, by the one or more processors, a condition of the driver by a machine learning method, based on information from the at least one image of the driver;
classifying, by the one or more processors, a condition of the interior environment of the vehicle using the machine learning method, based on information from the at least one image of the interior environment of the vehicle, wherein the machine learning method includes a general convolutional neural network (CNN) and an adaptive CNN using adaptive filters, and wherein the adaptive filters are applied to the at least one image of the interior environment of the vehicle and are also applied to activation maps from upper level layers in the general CNN;
combining, by the one or more processors, classification results from the at least one image of the driver and classification results from the at least one image of the interior environment of the vehicle;
comparing, by the one or more processors, the combined classification results with predefined thresholds to determine if a decision can be made based on existing information;
requesting, by the one or more processors, additional information regarding driver expression when a decision cannot be made based on existing information;
calculating a conditional probability of the condition of the interior environment of the vehicle for a given driver condition;
determining filters of the general CNN that have less than a prescribed influence in the calculation;
reducing and adapting the use of filters in the general CNN based on the determination of filters of the general CNN that have less than the prescribed influence in the calculation;
determining if the adaptive CNN with adaptive filters should be used in processing live data;
determining, by the one or more processors, safety of the vehicle based on the combined classification results; and
providing, by the one or more processors, a warning to the driver based on the safety determination.

2. The method of claim 1, comprising using backpropagation and chain rule to determine filters that have less than the prescribed influence in the calculation for a given driver condition.

3. The method of claim 1, comprising comparing the calculation to a threshold value.

4. The method of claim 3, comprising using a lookup table including driver conditions and corresponding interior environment conditions, when conditional probabilities of interior environment conditions given driver conditions are higher than the threshold value.

5. The method of claim 1, comprising using the general CNN and the adaptive CNN with adaptive filters to process live data of interior environment conditions.

6. The method of claim 5, wherein the live data of the interior environment conditions include the at least one image of the driver and the at least one image of the interior environment, the at least one image of the driver is part of a video and processing of the at least one image of the driver is part of processing the video, and the at least one image of the interior environment is part of a second video and processing of the at least one image of the interior environment is part of processing the second video.

7. The method of claim 1, comprising:
obtaining a probability of dangerousness using data of interior environment of a vehicle and data of driver facial expression;
comparing the probability with thresholds;
determining actions, if the probability is not within the thresholds;
determining whether a maximum number of trials is reached;
requesting additional data of driver expression if the maximum number of trials is not reached; and
setting the probability to an upper threshold if the maximum number of trials is reached.

8. The method of claim 7, including providing the warning if the probability is equal to or larger than the upper threshold, and not providing the warning if the probability is equal to or less than a lower threshold.

9. A warning device, comprising:
a non-transitory memory storage comprising instructions; and
one or more processors in communication with the memory storage, wherein the one or more processors execute the instructions to:
obtain at least one image of a driver of a vehicle;
obtain at least one image of an interior environment of the vehicle;
classify a condition of the driver by a machine learning method, based on information from the at least one image of the driver;
classify a condition of the interior environment of the vehicle using the machine learning method, based on information from the at least one image of the interior environment of the vehicle, wherein the machine learning method includes a general convolutional neural network (CNN) and an adaptive CNN using adaptive filters, and wherein the adaptive filters are applied to the at least one image of the interior environment of the vehicle and are also applied to activation maps from upper level layers in the general CNN;
combine classification results from the at least one image of the driver and classification results from the at least one image of the interior environment of the vehicle;
compare the combined classification results with predefined thresholds to determine if a decision can be made based on existing information;
request additional information regarding driver expression when a decision cannot be made based on existing information;
calculate a conditional probability of the condition of the interior environment of the vehicle for a given driver condition;
determine filters of the general CNN that have less than a prescribed influence in the calculation;
reduce and adapt the use of filters in the general CNN based on the determination of filters of the general CNN that have less than the prescribed influence in the calculation;
determine if the adaptive CNN with adaptive filters should be used in processing live data;
determine safety of the vehicle based on the combined classification results; and
provide a warning to the driver based on the safety determination.

10. The device of claim 9, wherein the machine learning method is configured to process the at least one image of the interior environment to classify the condition of the interior environment including identifying a phone with text on a display, alcohol, drugs or a weapon.

11. A vehicle, comprising:
a plurality of sensors configured to obtain images;
a non-transitory memory storage comprising instructions; and
one or more processors in communication with the memory storage and the plurality of sensors, wherein the one or more processors execute the instructions to:
obtain at least one image of a driver of the vehicle from at least one of the plurality of sensors;
obtain at least one image of an interior environment of the vehicle from at least one of the plurality of sensors;
classify a condition of the driver by a machine learning method, based on information from the at least one image of the driver;
classify a condition of the interior environment of the vehicle using the machine learning method, based on information from the at least one image of the interior environment of the vehicle, wherein the machine learning method includes a general convolutional neural network (CNN) and an adaptive CNN using adaptive filters, and wherein the adaptive filters are applied to the at least one image of the interior environment of the vehicle and are also applied to activation maps from upper level layers in the general CNN;
combine classification results from the at least one image of the driver and classification results from the at least one image of the interior environment of the vehicle;
compare the combined classification results with predefined thresholds to determine if a decision can be made based on existing information;
request additional information regarding driver expression when a decision cannot be made based on existing information;
calculate a conditional probability of the condition of the interior environment of the vehicle for a given driver condition;
determine filters of the general CNN that have less than a prescribed influence in the calculation;
reduce and adapt the use of filters in the general CNN based on the determination of filters of the general CNN that have less than the prescribed influence in the calculation;
determine if the adaptive CNN with adaptive filters should be used in processing live data;
determine safety of the vehicle based on the combined classification results; and
provide a warning to the driver based on the safety determination.

12. The vehicle of claim 11, wherein the one or more processors are configured to use a first machine learning method to process the at least one image of the driver and use a second machine learning method to process the at least one image of the interior environment of the vehicle.

13. The vehicle of claim 11, wherein the vehicle is a vehicle with an autonomous system.

14. The vehicle of claim 11, wherein using the machine learning method to process the at least one image of the driver includes using speech of the driver, using facial expressions of the driver, using gestures of the driver, and using physiological information of the driver.

15. The vehicle of claim 11, wherein a self-motivated algorithm is used to obtain additional data for the machine learning method.

16. The vehicle of claim 11, wherein classifying a condition of the driver of the vehicle includes recognizing at least one of a distracted driver, a drunk driver, a drowsy driver, or a frustrated driver.

* * * * *